United States Patent
Sundling et al.

(10) Patent No.: US 6,785,277 B1
(45) Date of Patent: Aug. 31, 2004

(54) SYSTEM AND METHOD FOR INTERNODAL INFORMATION ROUTING WITHIN A COMMUNICATIONS NETWORK

(75) Inventors: Karl Johan Marten Sundling, Stockholm (SE); Christer Gilén, Tyresö (SE)

(73) Assignee: Telefonaktiebolget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/130,184

(22) Filed: Aug. 6, 1998

(51) Int. Cl.⁷ .............................................. H04L 12/56
(52) U.S. Cl. ...................................... 370/392; 370/389
(58) Field of Search ................................ 370/254, 255, 370/256, 389, 392

(56) References Cited

U.S. PATENT DOCUMENTS

| | | | |
|---|---|---|---|
| 5,031,093 A | | 7/1991 | Hasegawa .................. 364/200 |
| 5,088,032 A | | 2/1992 | Bosack ...................... 395/200 |
| 5,115,433 A | | 5/1992 | Baran et al. ............... 370/94.3 |
| 5,265,092 A | | 11/1993 | Soloway et al. ............ 370/60 |
| 5,488,608 A | | 1/1996 | Flammer, III ............ 370/85.13 |
| 5,493,564 A | | 2/1996 | Mullan ....................... 370/54 |
| 5,506,838 A | | 4/1996 | Flanagan .................... 370/54 |
| 5,530,806 A | * | 6/1996 | Condon et al. |
| 5,583,848 A | * | 12/1996 | Glitho ........................ 370/248 |
| 5,649,108 A | * | 7/1997 | Spiegel et al. .............. 370/400 |
| 5,699,358 A | | 12/1997 | Festl et al. .................. 370/351 |
| 5,732,072 A | * | 3/1998 | Thanner et al. ............. 370/255 |
| 5,732,086 A | * | 3/1998 | Liang et al. ................ 370/410 |
| 5,740,346 A | * | 4/1998 | Wicki et al. |
| 5,881,243 A | * | 3/1999 | Zaumen et al. ........ 395/200.71 |
| 6,041,049 A | * | 3/2000 | Brady ........................ 370/351 |
| 6,141,411 A | * | 10/2000 | Robinson et al. ........... 379/221 |
| 6,151,319 A | * | 11/2000 | Dommetry et al. ......... 370/395 |
| 6,151,635 A | * | 11/2000 | Bare .......................... 709/241 |
| 6,167,025 A | * | 12/2000 | Hsing et al. ................ 370/216 |
| 6,215,765 B1 | * | 4/2001 | McAllister et al. ......... 370/217 |

FOREIGN PATENT DOCUMENTS

EP 0 224 229 A2 11/1986

* cited by examiner

Primary Examiner—Kenneth Vanderpuye

(57) ABSTRACT

A system and method for facilitating the routing of small information packages between nodes in a network. In particular, the system and method of the present invention utilize a routing table at each node of the network. The routing table for each node contains a list of the nodes, ordered the same in each table, and an indexing value is utilized to refer to particular node values. Internodal linkage information is also stored in the routing table along with an alternative link should the primary link fail. The addition/deletion of nodes and the failure of any link is handled by an update function.

49 Claims, 6 Drawing Sheets

| U1 | N1 | — | — |
|---|---|---|---|
| U2 | N4 | N1:L1 | N1:L2 |
| U3 | N2 | N1:L2 | N1:L1 |
| U4 | N3 | N1:L1 | N1:L2 |

N1's Routing Table — 300

| U1 | N1 | N2:L1 | N2:L2 |
|---|---|---|---|
| U2 | N4 | N2:L2 | N2:L1 |
| U3 | N2 | — | — |
| U4 | N3 | N2:L2 | N2:L1 |

N2's Routing Table — 310

| U1 | N1 | N3:L3 | N3:L2 |
|---|---|---|---|
| U2 | N4 | N3:L1 | — |
| U3 | N2 | N3:L2 | N3:L3 |
| U4 | N3 | — | — |

N3's Routing Table — 320

| U1 | N1 | N4:L1 | — |
|---|---|---|---|
| U2 | N4 | — | — |
| U3 | N2 | N4:L1 | — |
| U4 | N3 | N4:L1 | — |

N4's Routing Table — 330

| U1 | N1 | — | — |
|----|----|----|----|
| U2 | N4 | N1:L1 | N1:L2 |
| U3 | N2 | N1:L2 | N1:L1 |
| U4 | N3 | N1:L1 | N1:L2 |

N1's Routing Table — 300

| U1 | N1 | N2:L1 | N2:L2 |
|----|----|----|----|
| U2 | N4 | N2:L2 | N2:L1 |
| U3 | N2 | — | — |
| U4 | N3 | N2:L2 | N2:L1 |

N2's Routing Table — 310

| U1 | N1 | N3:L3 | N3:L2 |
|----|----|----|----|
| U2 | N4 | N3:L1 | — |
| U3 | N2 | N3:L2 | N3:L3 |
| U4 | N3 | — | — |

N3's Routing Table — 320

| U1 | N1 | N4:L1 | — |
|----|----|----|----|
| U2 | N4 | — | — |
| U3 | N2 | N4:L1 | — |
| U4 | N3 | N4:L1 | — |

N4's Routing Table — 330

FIG. 5

| Bit | | | | | | | | Comment |
|---|---|---|---|---|---|---|---|---|
| 7 | 6 | 5 | 4 | 3 | 2 | 1 | 0 | |
| Data messages ||||||||| |
| 0 | Node = 0-127 ||||||| Message with destination=specified node |
| 1 | 1 | 1 | 1 | 1 | 1 | 1 | 1 | Broadcast message to all nodes |
| LRIP messages including link supervision ||||||||| |
| 1 | 0 | Network Primitive |||||| Special Message |
| | | PING |||||| Establish contact and supervise a link |
| | | PONG |||||| Acknowledge a PING upon a link |
| | | ROUTECHANGE |||||| Transmit routing information to connected nodes |
| | | PRACK |||||| Primary Acknowledgement of a ROUTECHANGE |
| | | FRACK |||||| Final Acknowledgement of a ROUTECHANGE |
| | | REROUTECHANGE |||||| Retransmission of the ROUTECHANGE message |
| | | FRACKA |||||| FRACK message acknowledge |

FIG. 6

| Header Data | Value | Comment |
|---|---|---|
| PING | H'80 | Link connect request |

FIG. 7

| Header Data | Value | Comment |
|---|---|---|
| PONG | H'81 | Link connect response |

FIG. 8

| Header Data | Value | Comment |
|---|---|---|
| ROUTECHANGE | H'82 | |
| SL | 1-31 | Length of session number |
| Cost | 0-31,000 H'FFFF | Cheapest link for sending messages |
| Destination Code | 32-char string | |
| Origination Code | 32-char string | |
| SNO | 2-33 bytes | session number |

FIG. 9

| Header Data | Value | Comment |
|---|---|---|
| PRACK | H'83 | Primary acknowledgement of routing information |
| SL | 1-31 | Length of session number |
| Dummy | 0 | Adjustment |
| Destination Code | 32-char string | |
| Origination Code | 32-char string | |
| SNO | 2-33 bytes | session number |

FIG. 10

| Header Data | Value | Comment |
|---|---|---|
| FRACK | H'84 | Final acknowledgement of routing information |
| SL | 1-31 | Length of session number |
| Dummy | 0 | Adjustment |
| Destination Code | 32-char string | |
| Origination Code | 32-char string | |
| SNO | 2-33 bytes | session number |

FIG. 11

| Header Data | Value | Comment |
|---|---|---|
| ROUTECHANGE | H'85 | Retransmission of a ROUTECHANGE |
| SL | 1-31 | Length of session number |
| Cost | 0-31,000 H'FFFF | Cheapest link for sending messages |
| Destination Code | 32-char string | |
| Origination Code | 32-char string | |
| SNO | 2-33 bytes | session number |

| Header Data | Value | Comment |
|---|---|---|
| FRACKA | H'86 | FRACK acknowledgement |
| SL | 1-31 | Length of session number |
| Dummy | 0 | Adjustment |
| Destination Code | 32-char string | |
| Origination Code | 32-char string | |
| SNO | 2-33 bytes | session number |

SYSTEM AND METHOD FOR INTERNODAL INFORMATION ROUTING WITHIN A COMMUNICATIONS NETWORK

BACKGROUND OF THE PRESENT INVENTION

1. Field of the invention

The present invention relates to communications networks having a number of interconnected components or nodes, and, in particular, to a system and method for improving internodal communications within a network of interconnected nodes.

2. Background and Objects of the Present Invention

With the exponential growth of the computer and the computer industry over the last few decades, information technology (IT) systems employing an ever-increasing number of interconnected computers and other components have become commonplace. A typical IT system or intranet may contain dozens of computers, servers and peripheral (printers, facsimile machines, etc.) equipment interconnected in a lattice or network. In the telecommunications industry, switching processors and other components are also becoming increasingly interconnected.

Within any such interconnected network of computers, processors, switches, etc., intercommunications between the various components, also referred to herein as nodes, are also growing rapidly with the increasing thirst for information sharing resources. Between the various nodes in a telecommunications system and extensions upon existing systems, for example, real-time communications are necessary to coordinate phone calls therethrough.

Existing protocols for implementing internodal data communications, although generally providing sufficient speed, efficiency and error handling for large networks and lengthy data communications, are not well-suited for small information package exchange. It has been found that for internodal communications of roughly 50 bytes or less between a small number, e.g., under 40, of nodes, existing protocols are not efficient. In fact, the "overhead" for such small scale communications under existing protocols in addressing, routing and error checking is often much larger than the original information content.

It is therefore, a first object of the present invention to provide an improved system protocol so that small information packages may be transported internodally with only a small amount of overhead.

It is also an object of the present invention to employ an improved addressing protocol to simplify internodal information package exchange and reduce the amount of data transference thereby.

It is another object of the present invention to provide alternative routes or links for the various internodal connections ranked according to the transmission costs associated with each alternative.

It is a further object of the present invention that if a communication link between two nodes in a real-time system fails, the improved system and method will discover the link failure and recover quickly by rerouting communications along an alternate route.

It is a still further object of the present invention to provide an improved system and method for internodal communications such that if nodes therein are deleted or added, the system and method will discover the alteration and modify operations accordingly.

SUMMARY OF THE INVENTION

The present invention is directed to a system and method for facilitating the routing of small information packages between nodes in a network. In particular, the system and method of the present invention utilize a routing table at each node of the network. The routing table for each node contains a list of the nodes, ordered the same in each table, and an indexing value is utilized to refer to particular node values. Internodal linkage information is also stored in the routing table along with alternative links should the primary link fail. The addition/deletion of nodes and the failure of any link is handled by an update function.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 5 is an illustration of a message header utilized in practicing the system and method of the present invention.

FIG. 6 is an illustration of a link command used in the present invention;

FIG. 7 is an illustration of another link command used in the present invention;

FIG. 8 is an illustration of a routing command used in the present invention;

FIG. 9 is an illustration of an acknowledgment command used in the present invention;

FIG. 10 is an illustration of a another acknowledgment command used in the present invention;

FIG. 11 is an illustration of another routing command used in the present invention;

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art.

As discussed in the background section, conventional techniques for inter-nodal communications employ elaborate protocols with large informational overhead, e.g., lengthy addresses of the source and destination nodes and other routing information. In particular, a simple message from a source node to a destination node could easily double, triple or more in size as the extra routing, error checking and miscellaneous other data was appended. For example, conventional identifiers employ a concatenation of various source identifications: device type, line, product number or run, serial number, distribution lot, etc., quickly forming an ungainly, albeit unique, identification. Appended to this are additional bits or bytes for the routing and error checking, as is well understood in the art.

Although conventional techniques and big overhead protocols are satisfactory in large, elaborate networks, in small networks, for example, under 40 or so nodes, and for small information packages or messages therebetween, for example, under 50 or so bytes, another approach is needed to promote efficiency, speed and error handling. Such an approach, simplifying the routing of small message packages between nodes, is the subject of the present invention and is described in more detail below.

Figure 1:
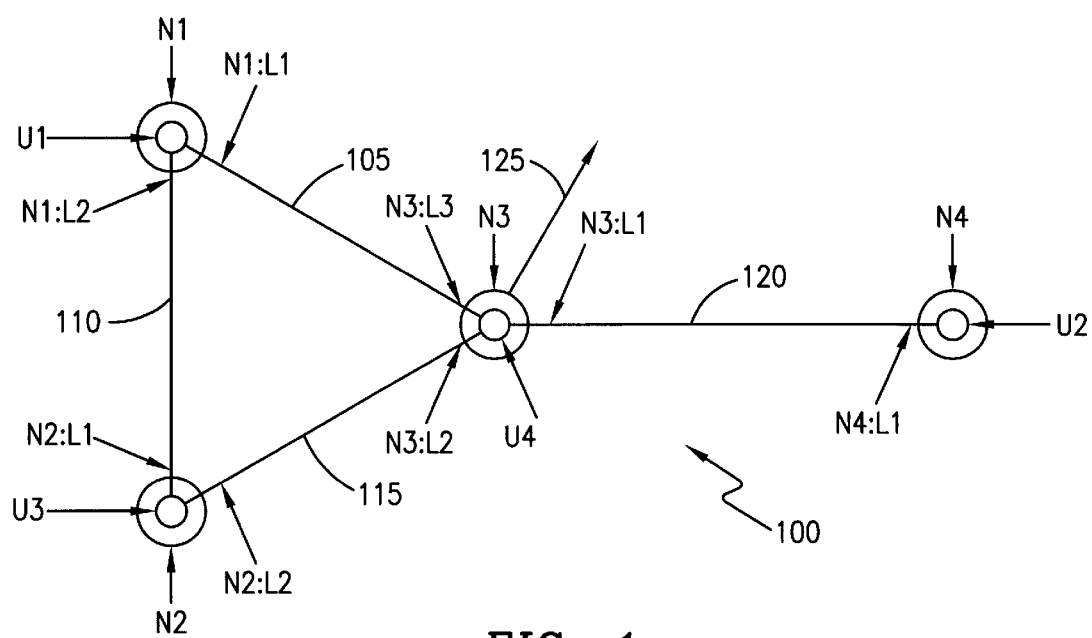
FIG. 1 is an exemplary network system having a relatively small number of nodes, upon which the principles of the system and method of the present invention may be employed.

With reference now to FIG. 1 of the drawings, there is illustrated an exemplary embodiment of a small, i.e., four node, network within which the principles of the present invention may be implemented. It should, of course, be understood that the principles of the present invention may be implemented on larger (and smaller) networks of nodes. As illustrated in FIG. 1, a network, generally designated by the reference numeral 100, contains therein various nodes, i.e., nodes N1, N2, N3 and N4, as well as a number of links, segments or paths therebetween. For simplicity, each of the nodes constitutes or contains therein a computer, server or other processing unit, i.e., units U1, U2, U3 and U4.

With reference again to the network 100 in FIG. 1, node N1 contains unit U1 therein and has two links therefrom, i.e., a first link N1:L1 which connects node N1 to node N3 across a first internodal segment 105, and a second link N1:L2 which connects node N1 to node N2 across a second segment 110. Similarly, node N2 contains unit U3 therein and has two links therefrom, i.e., a first link N2:L1 which connects node N2 to node N1 across the segment 110, and a second link N2:L2 which connects node N2 to node N3 across another segment 115. Node N3, likewise, contains unit U4 therein and has three, links: (1) a link N3:L1 which connects node N3 to node N4 across a further segment 120, (2) a link N3:L2 which connects node N3 to node N2 across the segment 115, and (3) a link N3:L3 which connects node N3 to node N1 across the segment 105. Lastly, node N4 contains unit U2 therein and has only one link, i.e., link N4:L1, which connects node N4 to node N3 across the segment 120.

Intercommunications between the nodes according to the present invention is accomplished through the utilization of a simplified and uniform addressing scheme, which is described in more detail later in this specification. Instead of the high overhead of existing protocols, the addressing scheme of the present invention employs address indexing, whereby the full identifier or address of a node or processing unit need not be employed to specify that unit. Instead, a smaller identifier is utilized to economize on message size and thereby increase transmission speed. Several addresses and identifiers are employed, e.g., the aforementioned unique nodal unit address, a smaller index identifier and a physical or topological network address, all discussed in more detail below.

As discussed, the aforementioned nodal unit address is a concatenation of various information relating to that unit, e.g., the unit's product number and serial number, forming a unique identifier for the unit, e.g., a mother board or processor. It should, therefore, be understood that if the unit were replaced at a given node, the identity or unit address for that node, e.g., unit U1 in node N1 of FIG. 1, would change, e.g., to unit U5.

It should be understood that the improvements of the system and method of the present invention are most suitable to relatively static networks that infrequently add or delete units or nodes. It should also be understood, however, that since the unit address information is typically utilized infrequently, e.g., usually during network setup only, the lengthy and ungainly unit address identifiers of the prior art may be employed to form the simpler index identifiers that serve the same function in the present invention using a fraction of the transmission bandwidth.

Figure 2:
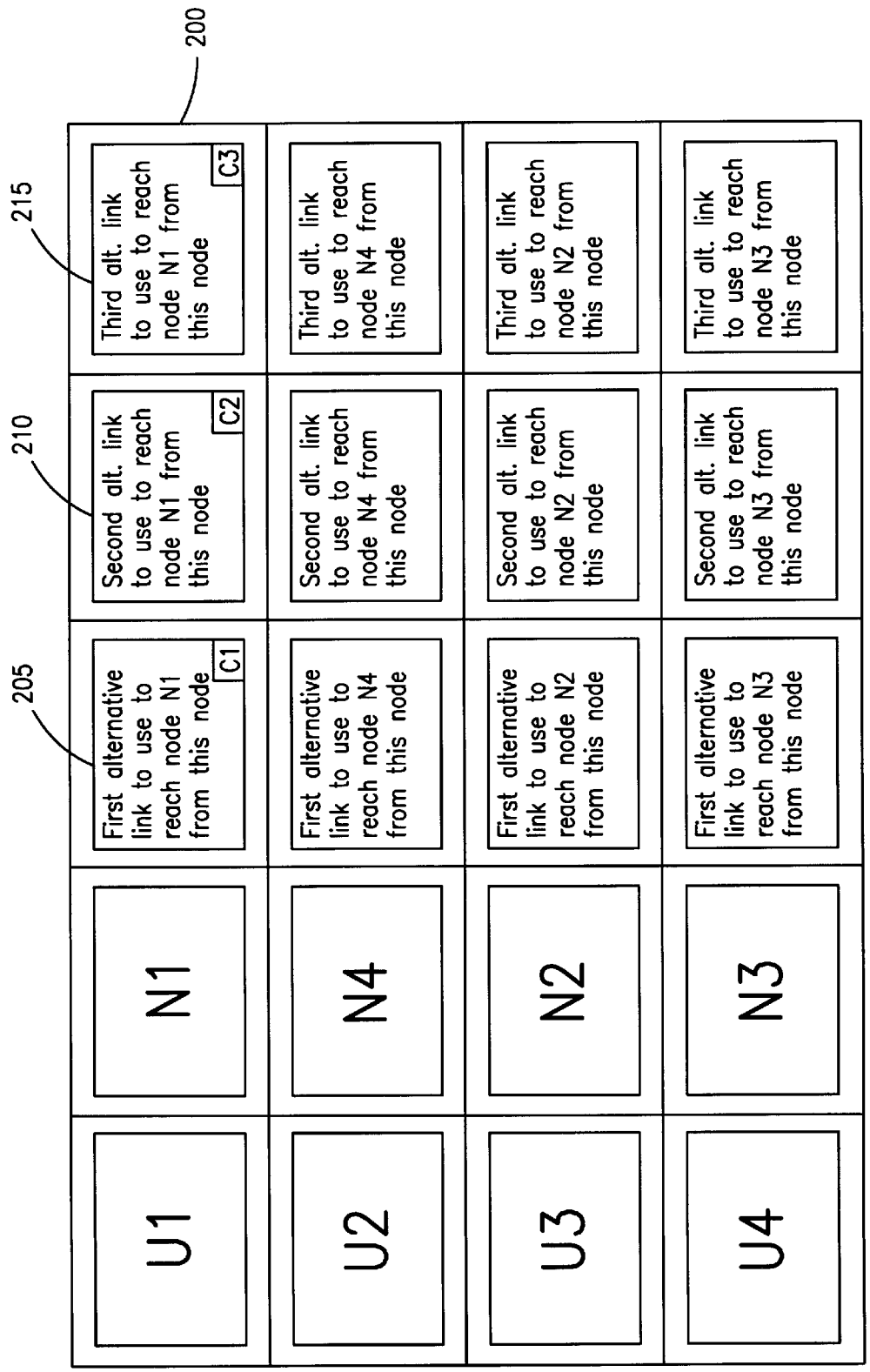
FIG. 2 is a routing table employed at the various nodes within the network system shown in FIG. 1 and exemplary contents therein.

Shown in FIG. 2 is an exemplary routing table 200 which is preferably utilized at each of the nodes of the network 100 shown in FIG. 1. The first column of the routing table 200 contains the above unit addresses of the various nodes within network 100 which are sorted in accordance to the values of the respective identities or unit addresses, identified in sorted order as units U1 to U4 in FIG. 1. In a preferred embodiment of the present invention, described in more detail hereinafter, the unit addresses (NODE-ID) constitute an alphanumeric string of up to 32 characters.

As shown in FIGS. 1 and 2, the ordering of the routing table or list 200 is independent of the configuration or topology of the network 100, and is, preferably, solely dependent on the alphanumeric (or other defined) ordering of the particular unit addresses of all of the nodes, i.e., U1 to U4, in the given network 100. In the example of FIGS. 1 and 2, although unit U1 corresponds with node N1, the remaining nodes bear no ordinal relationship: unit U2 is paired with node N4; unit U3 with node N2; and unit U4 with node N3. In any event, each node in the network 100 contains a respective routing table 200 therein, each having the same unit address entries U1 to U4 in that order.

Figures 3, 4:
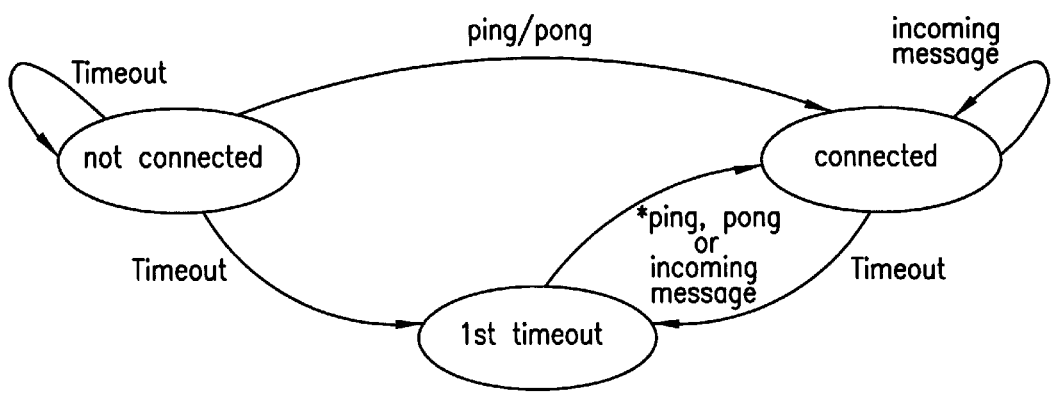
FIG. 3 illustrate further examples of routing tables, such as shown in FIG. 2, used in conjunction with the system and method of the present invention.
FIG. 4 is a state diagram illustrating various states for various nodes when practicing the system and method of the present invention.

Since each routing table 200 is sorted using the aforedescribed unit addresses, each routing table 200 in each node of network 100 has a uniform structure. With reference now to FIG. 3, there are illustrated routing tables 300, 310, 320 and 330 corresponding to each of the aforedescribed nodes N1, N2, N3 and N4, respectively, of FIG. 1. As shown, each routing table is ordered consistently, i.e., according to the particular unit addresses U1 to U4 within network 100, along with the corresponding node associated therewith, i.e., nodes N1, N4, N2 and N3, respectively.

It should be understood that by so ordering each of the routing table entries or elements by their unit addresses, each node within network 100 need not transmit the lengthy, e.g., 32 byte, unit address identification to other nodes within the network 100. Instead, only a short, e.g., 8-bit, integer reference or index is needed to refer to a given unit address within each ordered list. For example, unit U1 (and node N1) can have a zero indices, i.e., indicating the first element within the respective routing table. Unit U2 (and node N4), therefore, would have an indices of one, and units U3 and U4 indices of two and three, respectively. Using an 8-bit variable would allow up to 256 distinct unit index addresses. It should, of course, be understood that larger (or smaller) integer ranges may be employed for different-sized networks, e.g., a two-bit value for the four values in the example of FIG. 1. It should be understood, however, that if a unit address (node device) is removed from or added to the network 100, the ordering thereafter changes and the index values would have to be updated, as discussed further hereinafter.

Another address utilized in the present invention is a physical address associated with the respective node's physical location within the network 100. In other words, the physical address field pertains to the topology or physical interrelationships between the discrete nodes, e.g., node N3 has a particular value associated therewith which is separate and distinct from the other nodes in network 100. The topology and connectivity information between the various nodes within a network 100 is typically defined when the network 100 is setup and remains the same even if a particular unit, e.g., a new motherboard or processor (U) for a given node, is exchanged. As with the unit index address, the values for the physical address in the preferred embodiment of the present invention are also short integers, facilitating their use within a short internodal message. It should be understood, however, that there is no correlation between the physical addresses and the routing protocol, and that the physical addresses are needed when a "user" at the transport layers needs to send data.

Before the network 100 can be used, the improved routing protocol of the present invention needs to be initialized, although it should be understood that no particular set-up, start or configuration phase is required for the present invention, i.e., any configurations or reconfigurations may be due at any time. During the initialization, a routing table 200, such as the one illustrated in FIG. 2, is created for each node. The routing table 200 is built up with information from routing messages received from each node in the network 100. In particular, during the initialization each node preferably sends a routing message on all of the links to which it is connected. The routing message contains information on the node's unit address, i.e., the lengthy identifier and the number of links needed to reach it. When a node receives a routing message on a link, the node checks if this information has already been received. If the information in the message has been received before, it will be discarded; otherwise, the information, together with information on which link the message was received on, is stored in the routing table 200. The receiving node will also add one to the number of links needed to reach the specified node in the message before forwarding the message on all links except the link the message was received on.

With reference again to FIG. 2, for each node the routing table 200 contains a list of alternative links to reach that node, the list sorted after the number of links involved in each alternative. A node will use a second alternative link in case the first alternative link goes down, and a third if the preceding two go down, etc.

When the set-up phase is over, the routing table contains a row of information for each node (and corresponding units) in the network. The rows in all routing tables are sorted by the node's unit address so that all routing tables in all nodes will have their rows sorted in the same order. The routing tables may be sorted differently for a short time after something has changed in the network, e.g., a unit in a node has been replaced, before all routing tables have been updated again.

The routing table information can be altered if any of the following events occur: (1) an incoming link, that was previously not available to the node, comes up working; (2) an incoming link, that was previously available to the node, turns out not to work; and (3) an incoming routing message on a link indicates an update change. If the routing on any of the routing tables are updated with route information that affects the first alternative route, the nodes will share this information with their neighbors. This contributes to a chain-reaction where everything is triggered from this type of event. Every node has this type of behavior so that the changes in the routing tables can be passed on to the neighboring nodes.

With reference again to FIG. 3, if a source node N1 wishes to transmit a short message in accordance with the present invention to a destination node N4, the sender (the address-principle of the transport layer) searches within the respective routing table 300 (of node N1) for routing information. Routing table 300 contains a first or primary link to node N4 in the second row, i.e., link N1:L1, and a secondary link N1:L2 should the primary link be down. As discussed, the unit index address used in referencing node N4 in this example is one, i.e., the second listing in the ordered list of routing table 300.

The source node N1, after consulting the corresponding routing table 300, sends the message on the primary link N1:L1, which corresponds to segment 105 in FIG. 1. Upon receipt of the message at node N3, i.e., the terminating end of segment or link 105, node N3 examines the message to obtain information on the message's destination. The message includes the unit index address of the destination node, i.e., one, providing node N3 with a simplified indication of where to send the message, i.e., check row two (index one) of the routing table 320, which specifies link N3:L1 as the primary link. No secondary link is specified for this example due to the topology of the network 100. Intermediate node N3, after consulting its routing table 320, forwards the message along with the index value on the link N3:L1, which corresponds to segment 120, to destination node N4. Upon receipt, node N4 examines the message, retrieves the aforementioned unit index address (one) and examines its own routing table 330 to determine where the message is destined, as above with node N3. As shown in FIG. 3, however, no links are provided, indicating a final destination node. For assurance, node N4 verifies that the user address indicated by the index, i.e., unit U4 by index value one, corresponds. If so, node N4 sends an acknowledgment message back to node N1 using the aforedescribed mechanism. Should node N1 not receive the acknowledgment, node N1 retransmits the message.

It should be understood that a particularly preferred embodiment of the system and method of the present invention is within a distributed system of interconnected processors serving a particular overall task, e.g., a digital telecommunications switching system such as exemplified in Applicants' Assignee's AXE digital switching systems, or in any application where small packets of information are transported between a small number of nodes, minimizing transmission overhead and reducing transport time. A particularly preferred embodiment at the present time is utilized in an extension module group in which a small number of processors, e.g., five to seven, form a small group or network serving a large number of telephone extension numbers, e.g., about 2,000. It should, however, be understood that the principles set forth in the present invention are applicable in any system and method for communicating between processors (or other nodal components) in a network where each processor maintains its own local routing list to other processors in the network. The invention is particularly directed to such systems and methods where the unit or device addresses are uniformly sorted in each routing list in a predetermined manner across all of the processors and uniquely indexable in each.

By way of further description on the particularly preferred embodiment and mode of practicing the system and method of the present invention, reference is now made to the Open Systems Interconnection (OSI) reference model that abstracts out various relationships between a network and the services which it can support as a hierarchy of protocol layers. As is understood in the art, each OSI layer uses the services offered by layers lower than itself in conjunction with its own functions to create new functions, which are made available to the higher layers. The standardized layers are as follows in increasing levels of hierarchy: (1) physical; (2) data link; (3) network; (4) transport; (5) session; (6) presentation; and (7) application.

In practicing the system and method of the present invention, the network layer is responsible for delivering messages to one specified destination node, as described hereinabove, or to all nodes with the assistance of the lower layers. As shown in FIG. 1, in each node the network layer is connected via one or more segments or links to its neighboring nodes in the network 100. Each link at the network layer is made up of a number of 64 kbit timeslots defined by a configuration application. The processors in the presently preferred extension module group, for example, share bandwidth across a common link to a local station, such as a node within a Public Switched Telephone Network (PSTN), illustrated by a link segment 125 in FIG. 1. The common link 125 may have a high bandwidth capacity, e.g., two Mbits, which is time shared by the various nodes in 64 kbit timeslots. A routing table, such as the routing table 200 in FIG. 2, is used to find the appropriate link when transferring messages to a particular destination node.

As discussed hereinabove, a setup routine is necessary to generate the requisite routing tables for each network node. An originating node broadcast message is first sent on all links to that node and back to the transport layer because the Transport Service Access Points (TSAPs) are not allowed to communicate directly with each other in one transport layer entity. In all other node broadcasts, messages are sent on all links except the link where the message is received and the message is delivered to the transport layer. It should be understood, however, that there is no guarantee of broadcast message delivery to all nodes, i.e., some messages may be lost in some nodes, which usually occurs only during routing table updates. It should also be noted that when reconfiguring the nodal network, which is not an automatic operation, message packets may reach wrong destinations during reconfiguration. The transport layer takes this reconfiguration difficulty into account and manages the situation in an established manner to provide error-free service to the user.

The aforementioned routing tables maintain information about all possible routes to reach a given node, as well as a cost associated therewith. In the present invention, for example, the cost for each route is calculated as the sum of the delay for each link in the actual route. In the present invention, the delay for one link may be normalized to 1,000/Bandwidth (BW), where BW is the number of 64 kbit timeslots in the link. For example, a link with 4 timeslots has a set cost of 250, and the term 1,000/BW is the delay for an 8 byte package in microseconds. Accordingly, the delay to reach a particular node will depend upon the number of discrete nodes to pass and the available bandwidth.

As discussed, when a message is transmitted to a particular node, the cheapest available way is selected first, i.e., the first or primary alternative route described in connection with FIGS. 2 and 3. When a link goes down or otherwise fails, the second (or subsequent) alternative route is used as soon as possible. All routing tables affected are updated. For example, in FIG. 1 should segment 105 fail, the routing table 300 for node N1 would make the secondary link, i.e., N1:L2, the primary link and delete the failed link N1:L1. The message would then detour along segment 110 before proceeding to nodes N3 and N4, as described. The return acknowledgment signal from node N4 would preferably alter the reverse linkage precedence of nodes N3 and N2 in transferring messages to node N1.

Each of the routing tables are preferably built by a routing protocol, such as Applicants' Assignee's Link Routing Information Protocol (LRIP), after the network is restarted. Each routing table is thereafter updated dynamically when necessary, as exemplified above. If, however, a node disappears or appears in the specified network 100, all of the routing tables in all of the nodes are updated, typically by a network supervision function.

As discussed, each node within the routing tables is sorted using the unit address (NODE-ID), a 32 byte alphanumeric string, and an integer index address is derived therefrom to minimize data package overhead when addressing the nodes within the network 100. With reference again to FIG. 2, each linkage alternative within routing table 200, e.g., a first 205, a second 210 and a third 215, have an associated cost, i.e., C1, C2 and C3, respectively, representing the microseconds of delay to reach the destination node using that link for an 8-byte information package. It should be understood that a cost of zero means that the information has reached its destination and no further routing is required. It should also be understood that the costs are preferably ordered as follows:

$$C1 < C2 < C3$$

It should further be understood that due to transmission bandwidth bottlenecks, a shorter route may have a higher cost than a lengthier, less-bandwidth-laden link. With reference again to FIG. 1, for example, although link 105 directly connects nodes N1 and N3, link 105 may have limited availability and a higher transmission cost than the transmission across links 110 and 115, the secondary alternative link in the routing table 300 of FIG. 3. Although only a small number of alternative links are illustrated in FIGS. 1–3, for a highly interlinked network a larger number of alternatives may be available, which may be implemented using a linked list of records or other data construct.

At the start or generation of the network 100, however, there are no node index addresses to simplify addressing. From an origination node, as soon as a link becomes available, the node begins to establish contact with a neighboring node at the terminating end of that link. Upon contact, all requisite routing table data within the origination node is transmitted to the connected node, and then all other nodes connected thereto (along with the costs). Messages are then sent containing the NODE-ID and the respective cost to transfer messages via this node.

When a routing table, such as table 200 in FIG. 2, is updated with a new NODE-ID or a new lower cost to reach a certain node from a certain link, this new linkage information is forwarded to all other available links, which means all nodes since the routing table updating is repeated in each node. To ensure that no false routes are entered in the routing table, each update on each link has to be acknowledged before an acknowledgment is sent to the originator. Each generated update message is marked with a session number, unique for each route, that makes it possible to identify such a message if it comes back to a node on another link than it was sent on. The session number makes it possible to have several sessions in parallel, that is, an update message can be sent on several links in parallel. If a message for a particular node (NODE-ID) provides no new link or no lower cost to the routing table, the information is discarded.

The routing table in a node is built up by a sorted list of all known NODE-IDs, ordered by a precedence operation common to all the nodes, e.g., ordering by ASCII character values. The first entry will be given node address equal to 0, the next entry in the list will be given node address equal to 1 and so on. The routing table list can be resorted during traffic when nodes disappear or new nodes are added. This means that some data packages might be delivered to the wrong transport layer entity if the nodes have been renumbered, e.g., previous node 4 has been renumbered to node 5. The higher layer entity that receives the message has to solve this problem.

It also means that broadcast data might not be delivered to all nodes. To minimize this problem, each node keeps track of previous routing table node addresses, that is, there is a memory upon which the node number each node had before last time the routing table was resorted. The previous number will only be valid for a specified time after that the routing table has been resorted. When a broadcast message is received with a source node address and a sequence number that does not match the expected sequence number, the network layer will try to look for a match with the previous node address.

The information packages or messages are routed by use of a network primitive, ROUTECHANGE, described in more detail hereinafter, which holds information as to the cost to reach a given node, through the sending node and via the particular link on which it is sent. Various rules govern how the aforedescribed routing tables are handled, when ROUTECHANGE is generated and how to act upon reception of a ROUTECHANGE message. A first rule is that when a link state, discussed in more detail hereinafter in connection with FIG. 4, is changed from "not connected" to "connected", this status change along with the transmission cost associated therewith is sent to all reachable neighboring nodes to that new available link. The respective newly-connected neighboring nodes can update their routing tables with the NODE-IDs that can be reached via the link of the received message, ensuring that the routing table only contains the cheapest cost for each possible link to a certain node.

The converse rule (rule 2) is directed to the situation when a link state changes to "not connected" in which case all occurrences of that link must be removed from the respective routing tables. If due to this link removal the cheapest cost is changed for any node, ROUTECHANGE messages are then generated to the other links with the cost change information for all affected nodes in the respective tables. Where no route exists to a node (rule three), the entry for that node is preferably removed from the routing table. For example, in FIG. 1 if segment or link 120 becomes disabled, node N4 is unreachable, and is preferably removed from the respective routing tables. The reason for this is that nodes can switch identities when repaired. Therefore, requiring re-entry of the node means that proper addressing and identification is preferred.

When various cost factors change (rule four), all or some of the respective routing tables must be modified to properly utilize this information. For example, if a new cheapest cost is determined, the primary alternative link may need to be changed so that the various nodes can transmit a message or the cheapest link. If the cheapest cost is changed for any node, ROUTECHANGE messages are generated upon other links with the cost change information for all affected nodes in the tables (rule five). For example, if the link that a given ROUTECHANGE was received from already exists as a possible routing case for the specified node, the cost is updated. Also, if a new link is introduced, that possibility may be added to the tables pursuant to the cost analysis. In the preferred embodiment of the present invention, when the cost for the second best route changes that change is communicated along the primary, best-cost route, guaranteeing that all of the nodes always have all possible routes available. The change to the second, third or subsequent best routes may be made as discovered or queued until a substantive modification or other additional changes are made.

It should be understood that the various updates of the routing tables are preferably performed by the aforedescribed LRIP messages, which stop automatically after all updating has been performed (rule 6). Lastly, for rule 7, the transmission cost is set to zero within a node since no transference or links are needed. As discussed, the cost is set to 1000/BW in each adjacent neighboring node's routing tables. The cost is increased by 1000/BW in each receiving node along the route to a destination node.

With reference now to FIG. 4, there is shown an infinite state machine model illustrating various states for the available links. As shown in the figure, there are three possible states for a given link, "not connected", "1st time-out" and "connected". The states work as follows: a given link always starts in the "not connected" state. A timer is started and every time the timer expires a so-called "ping" message is sent on the link. If a ping or a responsive "pong" message is received back, the state then changes to the "connected" state, which means that the link has established a contact with a neighboring node on this link. A timer also supervises the link connection. The timer is triggered upon each message that is received from the link. When the timer expires, however, a ping message is sent on the link and the state changes to "1st time-out", as illustrated in FIG. 4. The timer is running, however, and the links are waiting upon a response from the ping message generated in the connect state. Any received message will change the state back to connected. If the timer expires, however, the state is then changed to "not connected".

Every time the state is changed to "not connected", the routing table is updated and information about which nodes that no longer can be reached by this path are sent to all other links that are in the state "connected" or "1st time-out". Every time the state is changed from "not connected" to "connected" the existing information in the routing table is sent to the connected node upon this link.

It should be understood that the state diagram illustrated in FIG. 4 is exemplary of a potential mechanism for handling link status issues, and the scope of the present invention is not limited to this technique.

In the preferred embodiment of the present invention, the first byte of a network header message in accordance with the present invention is used to determine the type of message. A presently preferred configuration of the bits within that byte is shown in FIG. 5. As illustrated, the first bit, the left-most bit labeled "7" in the figure, is a mode bit, i.e., if a zero, a particular node is indicated in the following seven bits, i.e., bits six to zero, designating up to 128 distinct nodes.

If the first bit is set, however, a command node is indicated. One command, i.e., a broadcast to all nodes, is represented by a series of ones, "11111111". In this preferred embodiment, various LRIP messages and link supervision commands are indicated when the second bit, labeled "6", is zero. The various network primitives involved are the afore-described PING, PONG and ROUTECHANGE commands, along with a Primary Acknowledgment (PRACK), a Final Acknowledgment (FRACK), a REROUTECHANGE and a FRACK Acknowledgment (FRACKA). As discussed, PING is used to establish contact upon a link and to supervise a link, PONG is used to acknowledge a PING upon a link, and ROUTECHANGE is used to transmit routing information to connected nodes. A PRACK command is sent back on the link from which a ROUTECHANGE was received. A FRACK command is also sent back on the link where a ROUTECHANGE was received, but when a given node determines that the ROUTECHANGE does not have to be forwarded on to other nodes or when all outstanding ROUTECHANGES have been acknowledged by FRACKs. Each FRACK traverses backwards in the network to the originating node of the ROUTECHANGE. If after a given period of time no FRACKA has been received, the FRACK is retransmitted. Similarly, if no PRACK is received after a given time period, e.g., within about 40 ms, the ROUTECHANGE command is retransmitted.

With reference now to FIGS. 6 and 7, there are illustrated PING and PONG commands, respectively, designated by the respective hexadecimal values 80 and 81 in the right-most bits in the network header message of FIG. 5. The ROUTECHANGE command is further illustrated in FIG. 8 with various additional fields: a 5-bit session number length (SL), a 15-bit cost factor in hexadecimal, 32-byte alphanumeric DESTINATION and ORIGINATION node strings, and a 2–33 byte sequence number. As discussed, the cost field represents the cheapest link cost for sending messages to the specified DESTINATION node via the ORIGINATION node generating the message. If the cost is set to all ones, i.e., hexadecimal FFFF, this indicates that the DESTINATION node is no longer reachable via the generating node, which means that the path must be removed from the routing tables. Upon removal of all of the paths, the whole record for the DESTINATION node is removed. The SNO field indicates the session number.

With reference now to FIG. 9, a primary acknowledgment message or PRACK is illustrated. When a neighboring node receives a ROUTECHANGE from an adjacent note, the neighboring node by acknowledging that the routing command was received takes on the responsibility of further supervision when that neighbor is not an end or terminating node. The remaining fields are as described in connection with FIG. 8. Similarly, the FRACK command, illustrated in FIG. 10, handles the final acknowledgment of routing information to a source node. A REROUTECHANGE command is illustrated in FIG. 11, and a FRACKA command, a FRACK command acknowledgment, is illustrated in FIG. 12.

In view of the above discussion, additional illustrative examples of network message sequences and effects will now be described. With reference now to FIG. 13, an interlinked network 1300 of nodes A–D are illustrated. A proposed node E, discussed further herein, is shown in outline. To simplify cost calculations all links have a cost factor of one. To better illustrate the manner how the session number (SNO) is built up, the nodes are included in the SNO by a colon and a current link numbers. The sequence number is excluded for convenience. It should be understood that although the following sequences are presented serially, the sequences may also be practiced, were applicable, in parallel.

For a message to a particular destination node, e.g., from origination node A to destination node D, the message first passes to node C along a segment 1310. Using the afore-described index address to the routing table at node C, the network layer looks up node D (via the index) and finds the cheapest link therefrom to the destination node D, i.e., the only link thereto along segment 1320. After forwarding the message on the node D, the time to live is decremented by one and the link timer for link 0 in node C is triggered. Upon arrival of the message in node D, the network layer looks up node D and finds no further links, i.e., the message has reached its destination. At this point the network header is stripped off and the message is presented to the transport layer, at which time the link timer for link 0 within node D is triggered.

Figures 12, 13:
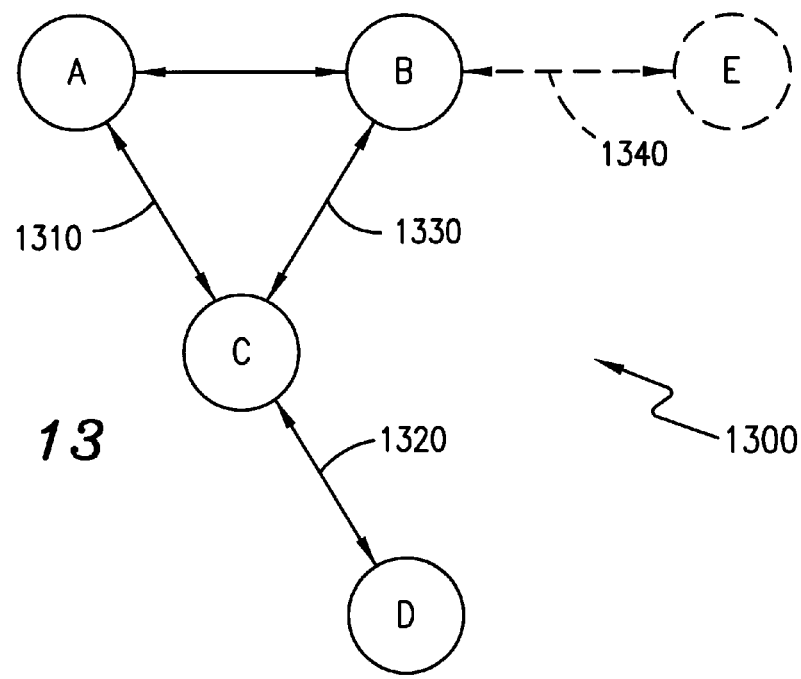
FIG. 12 is an illustration of another acknowledgment command used in the present invention.
FIG. 13 is an illustration of a sample network used in conjunction with the description to demonstrate the messaging capabilities of the system and method of the present invention.

With further reference to FIG. 13, a message may be transmitted to all of the nodes in the network 1300 from, for example, node A. Upon arrival at node C, the network layer checks that the message has not been received earlier. If the message has not been received earlier, then the network layer presents the message to the transport layer and forwards the message on all other links. The time to live is then decremented by one, and the link timer for path 0 in node C is triggered. In this manner, the broadcast message is sent from node C to nodes B and D in FIG. 13, attached thereto.

Where a given link disappears, e.g., node A becomes unreachable through node C, this condition is discovered when a timer for link 0, i.e., from node C to node A across segment 1310, expires a second time, changing the link state for link 0 to "not connected", as described in connection with FIG. 4. The routing table at node C within the network 1300 must, therefore, be updated and a ROUTECHANGE message is sent to inform the other or neighboring nodes attached thereto, i.e., nodes B and D, about the change across segments 1330 and 1320 respectively. The NODE-ID for node A is sent along with the cost FFFF, indicating that node A is unreachable via node C. The SNO is set to a session C:1 in node B, and session C:2 in node D, meaning node A is reachable (via node C) but with a changed cost, cost=2. Pursuant to rule 6 set forth above, since node B's and D's links to node A are unchanged, nodes B and D have no other links upon which to send a ROUTECHANGE. Nodes B and D send FRACK messages to node C and sessions C:1 and C:2 terminate.

With reference again to FIG. 13, when a new node, e.g., node E, is attached to the network 1300, e.g., at node B across a segment 1340, new node E, via a ROUTECHANGE command, connects to node B using the new NODE-ID for node E. The cost is set to zero and the SNO is set to E:0. Upon adding new node E to the respective routing table for node B, the cost is set to one (received cost incremented by one). After receiving a PRACK from node B, supervision over node E is turned off. Node B is then responsible for forwarding ROUTECHANGES to its adjacent nodes, i.e., nodes A and C, designating the NODE-ID for node E, costs of one meaning node E is reachable, and sessions E:0+B:0, respectively. Node B thereafter receives respective PRACKS from nodes A and C, respectively, and supervision is turned off. Nodes A and C are then responsible for forwarding ROUTECHANGE messages to their own nodes.

Node C, for example, then updates node A attached thereto with a ROUTECHANGE command, designating NODE-ID for node E, SNO equal to E:0+B:0+C:0 and a cost of two, meaning reachable via node C. Node A then forwards a PRACK to node C, and then submits a ROUTECHANGE to node B, designating the NODE-ID for node E, cost=3 and session (SNO) equal to E:0+B:0+C:0+A:0. A final acknowledgment or FRACK is then received at node A from node B since node B is the node that initiated the session, which in a session list is identified by E:0+B:0. Since node A has received the FRACK from node B, node A can then FRACK node C, which it should be understood must wait on a FRACK (not yet sent) to node D before the respective FRACK message is sent to node B. Node C initiates the appropriate ROUTECHANGE to node D, designating the NODE-ID for node E, session E:O +B:0+C:2, and a cost of two meaning node C is reachable by node B. Node C, upon receiving the FRACK from node D, sends a FRACK message to node B, which must wait for a FRACK from node A before sending FRACK to node E.

Node A forwards a ROUTECHANGE command to node C, again designating NODE-ID as node E, the SNO is E:O+B:2+A:1, and a cost of two. Node C sends a PRACK message back to node A. Node C then initiates a ROUTECHANGE to node B, designating the NODE-ID as node E, session E:O+B:2+A:1+C:1 and a cost of two (meaning reachable via node B). Pursuant to rule 4 above, node C need not send a message to node D since a cheaper way already exists. Node B sends a FRACK to node C since node B initiated the session. Node B looks up its session list and identifies a session E:O+B:2. Node C then sends a FRACK to node A, which sends a FRACK message to node B, which finally sends a FRACK to the new node E.

It should be understood that the nodes according to the present invention, e.g., computers, may be interlinked in any manner, e.g., a ring formation, a star or in any other way.

It should also be understood that the system and method of the present invention in a preferred implementation utilizes datagram-type transport services, i.e., a connectionless application.

It should further be understood that a further advantage of the present invention in distributing the administration and control of the network to all of the nodes is the elimination of a master node, which if it fails means the entire network is on hold, necessitating the creation of a standby node to handle command functions until the master node reappears. Also, without a master node no startup sequence is needed since the routing mechanism is the same throughout the system, creating an advantageous symmetry of functionality.

In the above manner, each node performs the addressing without a master node coordinating it all. In effect, each node performs a mapping translation, mapping a large address space (the lengthy NODE-ID identifiers) into a smaller address space (the short index values referencing the list element within the respective routing tables).

It should additionally be understood that the system and method of the present invention is most useful in real-time critical systems requiring immediate communications of short messages across redundant pathways. As discussed, where the number of nodes increases substantially, e.g., over a hundred, the principles of the present invention became less advantageous, although still applicable for other efficiencies. Thus, in a preferred embodiment of the present invention, the number of nodes is under one hundred, preferably under forty or fifty and most preferably under ten. At the other end, when there are only two or three nodes, the efficiencies of the present invention may not be great enough to warrant implementation. Nonetheless, the principles of the present invention may be implemented in various ranges, e.g., 2–100, or more preferably, 2–50, 2–10 or 5–10, or most preferably 5–7.

It should also be understood that the use of the 32-byte string for the NODE-INFORMATION DISCLOSURE STATEMENT was illustrative only of the fact that the node names are rather lengthy addresses compared to the smaller, simpler index addresses, e.g., integers.

Although preferred embodiments of the system and method of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A network having a plurality of interconnected nodes, the network comprising:
    a plurality of processors for executing commands;
    a plurality of nodes for transmitting at least one message packet, each of said plurality of nodes including a respective one of said plurality of processors;
    a plurality of routing links for interconnecting said plurality of nodes;
    a plurality of routing tables respectively corresponding to each of said plurality of nodes, each of said routing tables comprising an ordered table of said plurality of nodes, the position of each node within each of said routing tables being the same;
    a set of commands embodied on the plurality of processors, the set of commands causes the processors to:
        retrieve, from the routing table of a first of said nodes, a first routing link for a message packet from said first node to a second of said nodes through said plurality of interconnected nodes, wherein the position of said second node within said first routing table is utilized in retrieving said first routing link;
        transmit said message packet from said first node to said second node across said first routing link;
        modify said plurality of interconnected nodes;
        update the respective routing table of the first node to indicate the modified configuration of said plurality of interconnected nodes;
        forward a node change command to the plurality of interconnected nodes other than the first node, said node change command updating respective routing tables of said plurality of interconnected nodes;
        wait, at each of said plurality of interconnected nodes, for receipt of the node change command; and
        update, upon receipt of the node change command by each of said plurality of interconnected nodes, the respective routing table for each node of the plurality of nodes.

2. The network according to claim 1, wherein an index value is associated with the position of each node within the respective routing tables.

3. The network according to claim 2, wherein said index value comprises an integer offset within the respective routing tables.

4. The network according to claim 1, wherein the routing table of said first node comprises a plurality of alternative routing links for said message packet from said first node to said second node through said plurality of interconnected nodes.

5. The network according to claims 4, wherein said set of commands further causes the processors to retrieve a second routing link from said first node routing table, said second routing link being utilized when said first routing link is unavailable.

6. The network according to claim 4, wherein said plurality of alternative routings within said routing table for said first node are linked via a linked list.

7. The network according to claim 1, wherein said message packet is dynamically routed from said first node to said second node through a plurality of intermediate nodes, the position of said second node within said first routing table and the respective routing tables associated with said intermediate nodes being utilized in dynamically routing said message packet to said second node.

8. The network according to claim 1, wherein when said message packet reaches said second node, said set of commands further causes the processes to retrieve from the routing table associated therewith no further routing links, said message packet being applied at said second node.

9. The network according to claim 1, wherein a plurality of pathways interconnect said plurality of interconnected nodes, each of said pathways having a transmission cost associated therewith, said first routing link for said message packet from said first node to said second node having the lowest cost for a transmission from said first node to said second node through said plurality of interconnected nodes.

10. The network according to claim 9, wherein a second routing link, at said routing table of said first node, has the second lowest cost for said transmission, said second routing link being utilized when said first routing link is unavailable.

11. The network according to claim 1, wherein said change in the configuration to said plurality of interconnected nodes is the connection of another node to at least one of said plurality of interconnected nodes, said another node being inserted at a given position into each of said routing tables and into another routing table associated with said another node, the position of each node within all of said routing tables being the same.

12. The network according to claim 1, wherein said change in the configuration to said plurality of interconnected nodes is the disconnection of a given one of said plurality of interconnected nodes, said given node being removed from a respective position within each of said routing tables, the routing table for said given one of said nodes being deleted, the position of each remaining node within all of the remaining routing tables being the same.

13. The network according to claim 1, wherein each of said nodes comprise a component selected from the group consisting of computers, servers, processors and other computing devices.

14. The network according to claim 1, wherein said plurality of interconnected nodes are arranged in a configuration selected from the group consisting of a star, a ring and other topological configurations.

15. The network according to claim 1, wherein the size of said message packet is within the range of 1–50 bytes.

16. The network according to claim 1, wherein the number of said plurality of nodes is within the range of 2 to 100.

17. The network according to claim 16, wherein the number of said plurality of nodes is within the range of 2 to 50.

18. The network according to claim 17, wherein the number of said plurality of nodes is within the range of 5 to 10.

19. The network according to claim 18, wherein the number of said plurality of nodes is within the range of 5 to 7.

20. In a communication system having a plurality of interconnected nodes, a method for routing a message packet from a first of said nodes to a second of said nodes, said method comprising:

referring, within said first node, to a first routing table associated therewith, each of said plurality of nodes within said communication system having a respective routing table associated therewith, each of said routing tables comprising an ordered table of said plurality of nodes, the position of each node within each of said routing tables being the same;

retrieving, from said first routing table associated with said first node, a first routing link for said message packet to said second node through said plurality of interconnected nodes, wherein, in said steps of referring and retrieving, the position of said second node within said first routing table is utilized in retrieving said first routing link;

transmitting said message packet from said first node to said second node across said first routing link;

modifying a configuration of said plurality of interconnected nodes;

updating the respective routing table of the first node to indicate the modified configuration of said plurality of interconnected nodes;

forwarding a node change command to the plurality of interconnected nodes other than of the first node, said node change command updating respective routing tables of said plurality of interconnected nodes;

waiting, at each of said plurality of interconnected nodes for receipt of the node change command; and upon receipt of the node change command by each of said plurality of interconnected nodes, updating the respective routing table for each node of the plurality of nodes.

21. The method according to claim 20, wherein, an index value is associated with the position of each node within the respective routing tables.

22. The method according to claim 21, wherein said index value comprises an integer offset within the respective routing tables.

23. The method according to claim 20, wherein, in said step of retrieving, a second routing link to said second node is retrieved from said first routing table, said second routing link comprising an alternative routing link for said message packet from said first node to said second node through said plurality of interconnected nodes, said second routing link being utilized in said step of transmitting when said first routing link is unavailable.

24. The method according to claim 20, wherein said first routing table comprises a plurality of alternative routing links for said message packet from said first node to said second node through, said plurality of interconnected nodes.

25. The method according to claim 20, further comprising:

repeating the steps of referring, retrieving and transmitting a plurality of times when said first and second nodes are separated by at least one other node there between, the first routing link in said first routing table comprising a link to an intermediate node, said message packet being transmitted from said intermediate node across another routing link toward said second node.

26. The method according to claim 25, wherein said step of repeating dynamically routes said message packet from said first node to said second node through a plurality of intermediate nodes, the position of said second node within said first routing table and the respective routing tables associated with said intermediate nodes being used to dynamically route said message packet to said second node.

27. The method according to claim 20, further comprising the step of applying, upon receipt at said second node, said message packet at said second node.

28. The method according to claim 20, wherein a plurality of pathways interconnect said plurality of interconnected nodes, each of said pathways having a transmission cost associated therewith, said first routing link for said message packet from said first node to said second node having the lowest cost for a transmission from said first node to said second node through said plurality of interconnected nodes.

29. The method according to claim 28, wherein a second routing link, at said routing table of said first node, has the second lowest cost for said transmission, said second routing link being utilized by said retrieval and transmission means when said first routing link is unavailable.

30. The method according to claim 20, wherein updating the respective routing links includes analyzing respective transmission costs associated with the respective routing links, said first routing link being the lowest cost routing link.

31. The method according to claim 20, further comprising the following steps:
  (a) after detection of a transmission cost change between said first and second nodes within said communication system, modifying the respective routing tables of said first, second and a plurality of intermediate nodes there between to order respective alternative routes between said first and second node pursuant to cost;
  (b) forwarding a node change command to nodes adjacent said first, second and intermediate nodes.

32. A communication system having a plurality of interconnected nodes, said communication system comprising:
  a plurality of routing tables, each of said routing tables corresponding to a respective one of said nodes, each routing table having a plurality of node identifiers being ordered in accordance to index values associated with the node identifiers; and
  address translation means for translating a first address space of said node identifiers for each of said plurality of interconnected nodes to a second address space, said first address space comprising an ordered list of said node identifiers, said second address space comprising the index values corresponding to the position of each node identifier within each of said muting tables, the respective position of each said node identifier within each of said muting tables being the same.

33. The communication system according to claim 32, further comprising:
  retrieval means to retrieve, from the routing table of a first of said nodes, a first routing link for a message packet from said first node to a second of said nodes through said plurality of interconnected nodes, and
  transmission means for transmitting said message packet from said first node to said second node across said first routing link.

34. The communication system according to claim 33, wherein the position of said second node within said first routing table is utilized by said retrieval means in retrieving said first routing link.

35. The communication system according to claim 32, wherein each of said index values comprises an integer offset within the respective routing tables.

36. The communication system according to claim 33, wherein the routing table of said first node comprises a plurality of alternative routing links for said message packet from said first node to said second node through said plurality of interconnected nodes.

37. The communication system according to claim 36, wherein said retrieval means retrieves a second routing link from said first node routing table, said second routing link being utilized by said transmission means when said first routing link is unavailable.

38. The communication system according to claim 36, wherein said plurality of alternative routings within said routing table for said first node are linked via a linked list.

39. The communication system according to claim 33, wherein said message packet is dynamically routed from said first node to said second node through a plurality of intermediate nodes, the position of said second node within said first routing table and the respective routing tables associated with said intermediate nodes being utilized by said retrieval means in dynamically routing said message packet to said second node.

40. The communication system according to claim 33, wherein a plurality of pathways interconnect said plurality of interconnected nodes, each of said pathways having a transmission cost associated therewith, said first routing link for said message packet from said first node to said second node having the lowest cost for a transmission from said first node to said second node through said plurality of interconnected nodes.

41. In a communication system having a plurality of interconnected nodes, a method for routing a message packet from a first of said nodes to a second of said nodes, said method comprising:
  ordering a plurality of node identifiers in accordance to index values associated with the node identifiers within each of a plurality of routing tables corresponding to a respective one of said nodes;
  mapping a first address space of said node identifiers for each of said plurality of interconnected nodes to a second address space, said first address space comprising an ordered list of said node identifiers, said second address space comprising the index values corresponding to the position of each node identifier within each of said routing tables for said interconnected nodes, the respective position of each said node identifier within each of said routing tables being the same;
  referring, with said first node, to a first routing table associated therewith;
  retrieving, from said first routing table associated with said first node, a first routing link for said message packet to said second node through said plurality of interconnected nodes; and
  transmitting said message packet from said first node to said second node across said first routing link.

42. The communication system according to claim 1, wherein said node change command generates at least one of the following modifications:
  adding another node to the respective routing tables, and
  deleting at least one of said plurality of interconnected nodes from the respective routing tables.

43. The communication system according to claim 1, wherein updating the respective routing links includes analyzing respective transmission costs associated with the respective routing links, said first routing link being the lowest cost routing link.

44. The method according to claim 28, wherein said modifying at least one said plurality of interconnected nodes includes at least one of the following:

connecting another node to at least one of said plurality of interconnected nodes, and removing at least one of said plurality of interconnected nodes from said communication system.

45. The method according to claim 20, wherein said node change command generates at least one of the following modifications:

adding another node to the respective routing tables, and deleting at least one of said plurality of interconnected nodes from the respective routing tables.

46. The communication system according to claim 32, wherein each said node identifier may represent an alphanumeric string of characters.

47. The communication system according to claim 32, wherein each of said index values may represent an integer reference of varying bit values.

48. The method according to claim 41, wherein each said node identifier may represent an alphanumeric string of characters.

49. The method according to claim 41, wherein each of said index values may represent an integer reference of varying bit values.

* * * * *